United States Patent [19]

Stevens, Jr. et al.

[11] Patent Number: 4,767,910
[45] Date of Patent: Aug. 30, 1988

[54] RAPID ROBOTIC ASSEMBLY CHANGE SYSTEM

[75] Inventors: Raymond R. Stevens, Jr., Vincentown, N.J.; Stanley E. Gondek, Philadelphia, Pa.; Dennis D. Cush, Oreland, Pa.; Robert Grimes, Jr., Telford, Pa.; Roberts L. Niner, Norristown, Pa.; Francis I. Connor, Jr., Plymouth Meeting, Pa.

[73] Assignee: The Budd Company, Troy, Mich.

[21] Appl. No.: 947,652

[22] Filed: Dec. 30, 1986

[51] Int. Cl.⁴ .............................................. B23K 9/12
[52] U.S. Cl. ................................ 219/125.1; 219/159; 901/42
[58] Field of Search ................. 219/159, 125.1, 86.24, 219/86.7, 79; 901/41, 42; 269/55, 57; 228/49.1

[56] References Cited

U.S. PATENT DOCUMENTS

| | | | |
|---|---|---|---|
| 3,316,382 | 4/1967 | Shumaker et al. | 219/79 |
| 3,321,606 | 5/1967 | Cropp et al. | 219/79 |
| 4,163,142 | 7/1979 | Descovich et al. | 219/79 |
| 4,381,858 | 5/1983 | Riche | 269/57 |
| 4,395,028 | 7/1983 | Kent | 269/57 |

FOREIGN PATENT DOCUMENTS

57-202986 12/1982 Japan ................................ 219/86.7

Primary Examiner—Clifford C. Shaw
Attorney, Agent, or Firm—E. M. Farrell; Herman Foster; T. I. Davenport

[57] ABSTRACT

A programmed welding control system is provided for welding automatically a variation of different weld patterns on different assemblies. The system includes a rotary table indexed to be moved to home, idle, and weld stations. An assembly of parts to be welded together are positioned on the rotary table at the work station and held by mechanical elements. Means are provided to identify a particular assembly to control a subsequent welding pattern, and to detect the presence or absence of the operator near the home station. When an assembly is present and the operator is away from the work station, the rotary table is rotated to the welding station when a robot with a welding gun is activated to automatically weld the parts of the assembly in accordance with a weld pattern previously determined at the home station. After the welding operation, the rotary table is rotated back to the home station.

9 Claims, 4 Drawing Sheets

RAPID ROBOTIC ASSEMBLY CHANGE SYSTEM

BACKGROUND OF THE INVENTION

In many welding operations used heretofore when a plurality of parts are to be welded together, various clamping mechanisms have been employed to position and hold the stampings together until the welding operation was completed. In conventional systems used heretofore, fixtures for holding the stampings have generally been extensive and costly. Generally, lines and valve units were required to control the sequence of steps throughout the welding operation.

In the past systems, an excessive amount of operator time was required to place, locate and load the clamps which were relatively large and generally included several pieces of steel welded together. This type of assembly fixture with extensive use of clamps adds higher costs to the overall production operation.

Programmable machines are well known. Such machines have been used to move parts to different positions, and also to control welding operations. One such machine is disclosed in a patent to Hohn #4,011,437. In this and other programmable systems all pieces or components are moved from one station to another where different operations are performed.

Many systems are programmed to perform particular movements and particular operations. Generally, if the movements or operations are revised or modified due to product modification or different assemblies of parts extensive time and costs are involved to make changes in the manufacturing system. For example, when a product change requires a change in one or several stampings within an assembly, modifications to the fixture must be made. Also material relating to the change generally involves relocation of pneumatic clamps, nesting gauges and other equipment to accommodate the different parts and welding pattern changes.

OBJECTS OF THE INVENTION

It is still an object of this invention to provide improved means for clamping a plurality of parts to be welded.

It is a further object of this invention to provide improved means for detecting and identifying a particular assembly of parts to be welded and automatically control a welding program to weld the assembly in accordance with a particular welding pattern.

It is an object of this invention to provide a flexible manufacturing system with quick change-over of fixtures at a work cell or station when different parts are involved.

It is a further object of this invention to provide means for rapidly changing the assembly fixtures at a work station in a minimum period of time.

It is still a further object of this invention to provide improved means for detecting and identifying a particular assembly at a work station and to control a subsequent welding pattern in accordance with the assembly identified.

It is further object of this invention to provide an improved automatic sensing system to sense the presence or absence of the parts within an assembly before subsequent operations can be performed.

It is the further object of this invention to provide improved safety detection means for automatically detecting the presence or absence of an operator or other person at a loading area before subsequent operations can proceed.

BRIEF DESCRIPTION OF THE INVENTION

In accordance with the present invention a preprogrammed automatic welding control system includes a rotary table adapted to receive different fixtures for different assemblies of parts or stampings. The fixtures which may be quickly changed include means for identifying the assembly of parts to be subsequently welded. The fixtures are placed on tooling pins located at each work station of the rotary table to precisely locate the fixtures. A detection system senses the absence of presence of an assembly on the table at the home station. Another detector senses the presense or absence of an operator at the work area at the home station. When an assembly is detected and the operator is away and clear of the work cell area, the rotary table is moved to the next work cell station, which may be the welding station, where the welding operation takes place. After the welding is completed, the rotary table automatically returns to the home position or station, where the completed assembly is removed by the operator. The sequence is then repeated.

Other objects and advantages of the present invention will be apparent and suggest themselves to those skilled in the art, from a reading of the following specification and claims, taken in conjunction with the accompanying drawings:

DESCRIPTION OF THE INVENTION

Before proceeding with a detailed description of the present invention, a general discussion of the system involved will be described.

As mentioned, prior to the present invention, assembly welding fixtures were designed and built as large strong and sturdy units. These fixtures included the use of pneumatic clamps, gauges, limit switches, piping and wiring which were required to accompany the fixtures. The type of fixtures required extensive facility space requirements for air, water and electricity. Because of this, conventional installations were dedicated to a specific component assembly with little or no flexibility with respect to other component assemblies, which also had to be welded and had to use the same parts of the system.

The overall purpose of the present invention is to provide a quick, easy and fully flexible manufacturing system which make maximum utilization of equipment needed to handle different assemblies to be welded.

While the same equipment is used, the quick change-over feature of the present invention for different fixtures and assemblies provide an overall efficient flexible manufacturing system. Also, the means for identifying a particular assembly on a fixture to control a subsequent weld pattern facilitates quick change-over feature.

Figure 1:
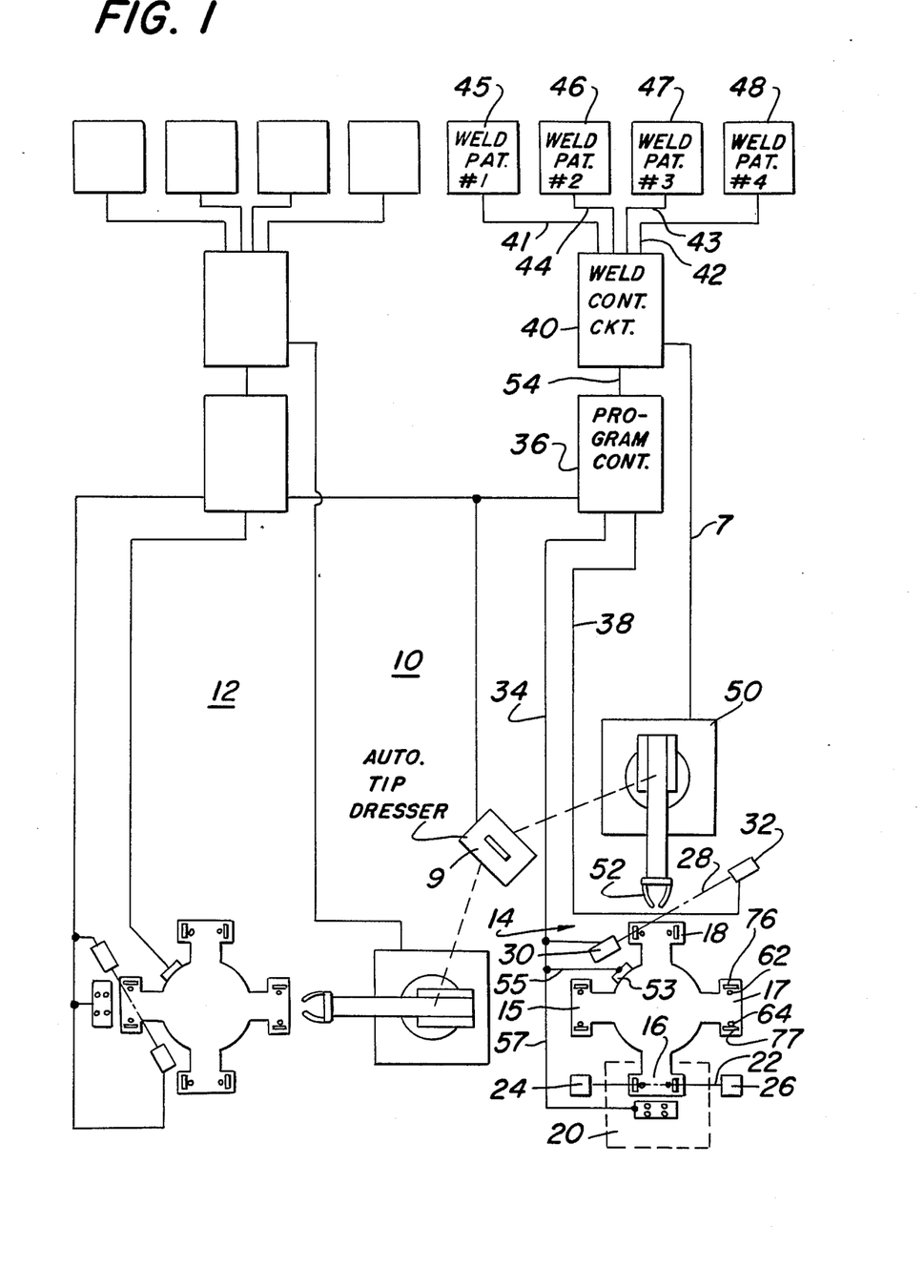
FIG. 1 is a block diagram illustrating generally a programmed rapid robotic assembly change used in a flexible manufacturing welding system.

Referring to FIG. 1, a dual operation involving separate systems 10 and 12 are illustrated. In a typical manufacturing operation, it may be desirable to weld two or more different assemblies at the same time, in order to speed up the overall assembly production operation. In describing the present invention, only the system 10 will be described in detail, it being understood that the system 12 may be substantially the same as the system 10.

The system 10 includes a rotary table 14 adapted to be rotated by means such as controlled motors or the like, not illustrated. Such means are wellknown to those skilled in the art. The table 14 may be designed to rotate a pre-determined number of degrees, for example, 90°. In the present invention four portions 15, 16, 17 and 18 are provided with the table portion 16 being considered as being at the home or work station, where an assembly is put on a fixture by an operator. The table portion 18 may be considered as being in the welding station. In the present invention, only the home and welding stations are involved in this description, it being understood that the rotary table 14 may be indexed in smaller increments, if desired, to permit intermediate operations.

Referring to FIGS. 2-6, along with FIG. 1, an assembly of parts to be welded are positioned and clamped to a fixture at the home station 16. An operator may be used to place the fixture and the assembly of parts on the rotary table 14 at station 16. The operator generally nests the various parts of the assembly in place by non-powered clamping means as will be described.

After the various parts have been nested by the operator between mechanical holding elements, means are provided to detect the presence or absence of the operator in the home station area before the rotary table 14 may turn. These safety means may include a safety mat 20 and a light beam 22 emitted from an emitter device 24 to a detector device 26. The mat 20 controls a switch to produce a signal. The light beam 22 produces a light curtain to detect an operator within an area, and also produces a signal to control subsequent operations.

A second light beam 28 having an emitter device 30 and a detector device 32 detects a condition in which an assembly of parts is present or absent on the rotary table 14 at the home station. The detection means for detecting the assembly is actually at the home station 16, although it is illustrated as being at the welding station 18 in FIG. 1 in order to more clearly illustrate how the beam is generated.

As will be described, when the fixture including the particular assembly of parts to be welded are placed on the rotary table 14 at the home station, means for identifying the fixture holding the assembly is used to control a welding program or subsequent welding pattern. Signals identifying the assembly of parts to be welded are transmitted through a line 34 to a program controller 36. At the same time, signals from the mat 20, light curtain including the beam 22, and the light assembly including the beam 28, are transmitted through a line 34 to the program controller 36. If any of the signals mentioned are not applied to lines 34 and 38, a condition is indicated that the operator is not away from the assembly area or that no part is present on the rotary table 14 at the home station. Under these circumstances, the program controller 36 will not develop signals necessary to rotate the rotary table 14 or to weld the assembly of parts. On the other hand, when all of these signals are present at the lines 34 and 38, the programmer 36 will develop signals which are applied a weld control circuit 40. This condition indicates that an operator is not on the mat, is away from the work assembly area and that there is an assembly of parts in the fixture at the home station.

The weld control circuit 40 develops electrical signals at one of the lines 41, 42, 43 or 44, which in turn are applied to weld control circuits 45, 46, 47 and 48, respectively. One of the weld pattern control circuits 45, 46, 47 or 48 will become actuated, dependent upon the particular assembly identified at the home station. and generate control signals which are transmitted back through lines 41, 42, 43 or 44 to the weld control circuit 40. Signals from the weld control circuit 40 are applied to a welding machine 50 through line 7 including a welding gun 52 where the assembly of parts disposed on the welding station 18 is welded in accordance with a pre-determined pattern.

The control circuit 40 generates signals to control the various movements of the welding machine and welding guns. No claim is being made in this application to the welding control circuits per se. The welding control circuit 40 may also re-transmit electrical signals back through a line 54 to the program controller 36. The program controller 36 may then transmit electrical signals to the line 34 to control the movement of the rotary table 14. It is understood that in describing the various lines that cables are normally used which include a plurality of wires or connectors. The invention is illustrated as single lines only for purposes of clarity.

To summarize the operation, after a fixture is in place on the rotary table at the home station, an operator inserts the parts of an assembly into the fixture and then moves away from the work assembly area. When assembly is present at the home station and the operator is away from the work area, signals from the program controller 36 moves the table 14 and indexes it to the next position which may be the welding position 18. At the welding station, the welder 50 and the welding gun 52 are controlled so that the welding gun 52, which includes a tip not illustrated moves close to the assembly of parts to perform a welding operation in accordance with a pre-determined pattern. The welder 50 includes the conventional features found in many welding machines such as expandable arms and the ability to move the welding gun to different angular positions. No claim is being made to the welding machine.

A feature of the present invention involves providing an automatic tip dresser 9 to periodically clean the tip of the welding gun 52. At appropriate times, the system is programmed to move the welding gun 52 to automatic tip dresser 9 where the tip is periodically cleaned. It is noted that the tip dresser may be used to clean the tips at more than one system, such as at systems 10 and 12.

Regarding the indexing of the rotary table 14, various limit switches, relays and the like are employed. The details relating to such elements are known to those skilled in the art and therefore not described in detail because they are only incidentally related to the present invention.

FIG. 1 illustrates four different welding patterns which may be produced, it being understood that more or less patterns could be involved in the welding operation dependent upon the number of different assemblies involved.

Signals for indexing the table 14 is generated by a circuit 53 which are transmitted to the program controller 36 through a line 55 and line 34. Signals from the probes to be described are transmitted to the program control circuit 36 through lines 57 and 34.

Figure 2:
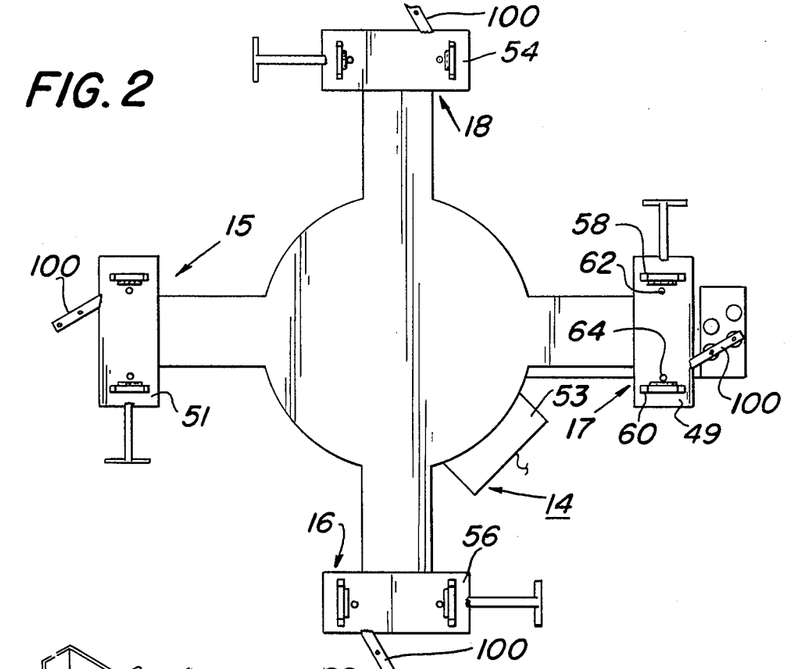
FIG. 2 illustrating a rotary table with different work locations, including some of the elements secured to the table.

Referring to FIG. 2, the rotary table 14 includes four portions 15, 16, 17 and 18 for receiving fixtures thereon including fixtures 49, 51, 54 and 56. Each of the fixtures 49, 51, 54 and 56 include a pair of fixture support cradles 58 and 60 as illustrated on the fixture 49. The remaining fixtures 51, 54 and 56 include similar fixture support cradles. The cradles are provided to support the assemblies when they are put on the fixtures.

The fixtures 49, 51, 54 and 56 include a pair of openings 59 and 61 (FIG. 4) therein to receive a pair of master tooling set-up pins 62 and 64. The set-up pins 62 and 64 are secured to the portions of the rotary table 14 below the fixtures, as illustrated in FIGS. 1,2 and 4.

Figure 3:
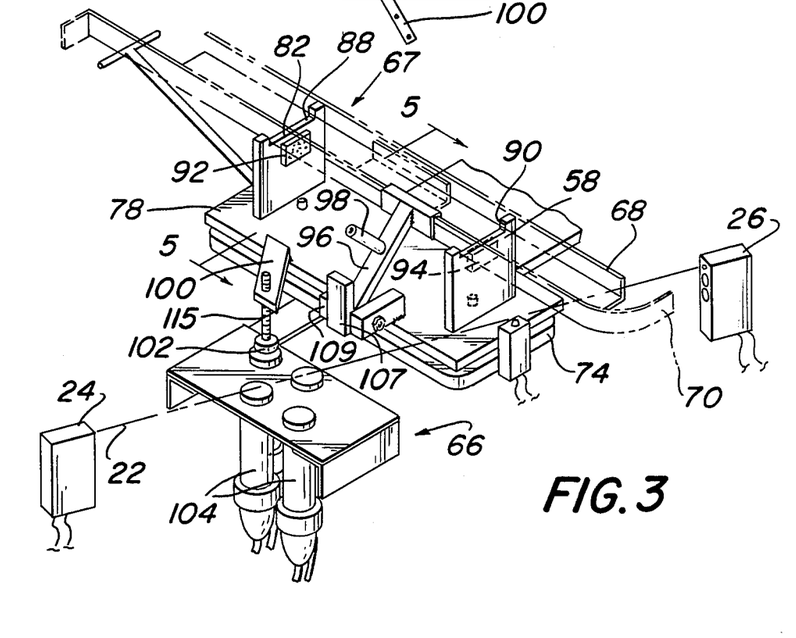
FIG. 3 is an isometric view illustrating some of the main components related to the present invention.
Figure 4:
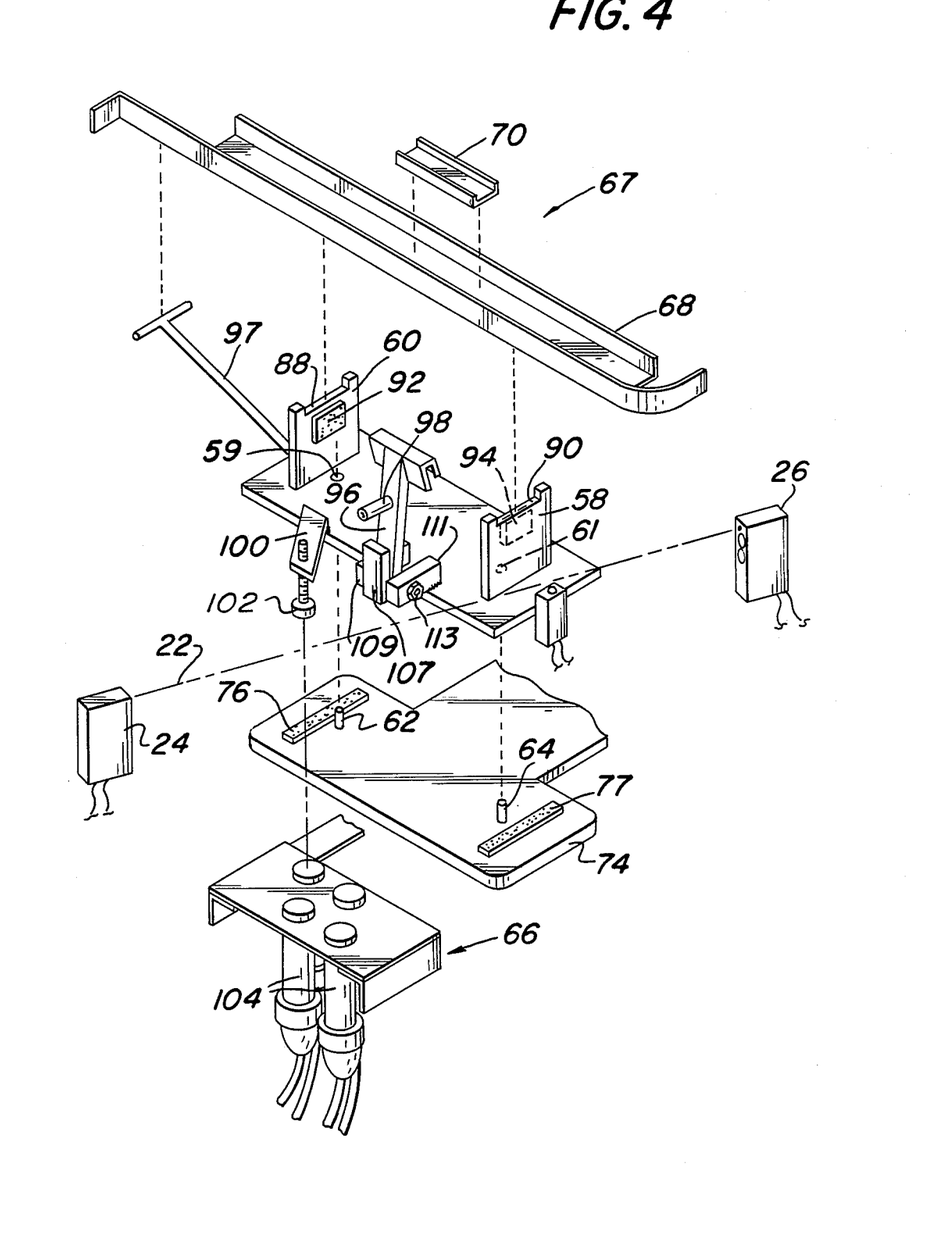
FIG. 4 is an exploded isometric view of the assembly of parts and components illustrated in FIG. 3.

The home station with a fixture and an assembly in the welding system is illustrated in FIGS. 3 and 4. The means for detecting the presence or absence of an assembly on a fixture as mentioned in connection with FIG. 1, includes the light beam 22 generated by an emitter device 24 and received by a receiver device 26. Means for identifying the assembly on the fixture is illustrated and includes an arrangement 66 to be described. A particular assembly of parts 67 is illustrated in dot-and-dash lines in FIG. 3 and in solid lines in FIG. 4. The assembly of parts 67 may include various stampings including stampings 68 and 70. These stampings are to be welded together and are clamped in position at the home station. The stampings may be pillars, reinforcements or other parts related to an automobile, for example.

A portion 74 of the rotary table is disposed to receive a fixture. The fixture include a main plate 78 and a pair of fixture support cradles 58 and 60. The rotary table includes permanent magnets 76 and 77 on the rotary table disposed to hold the fixture on the rotary table. Different types of fixtures involving a different assemblies of parts may be involved in practicing the present invention. Despite the differences in assemblies, the fixtures are designed to be easily mounted and located on the rotary table because of the locating pins 62 and 64 to add to the flexibility of the manufacturing system when different assemblies are to be welded. Change in the set-up for different assemblies may be done relatively easily and quickly with a minimum amount of down-time.

A clamping mechanism 96 movable into position by a handle 98, is provided to receive the two parts 68 and 70 to be welded together. After the clamping mechanism 96 has received the two or more parts for assembly, the assembly is movably mounted in cut-away portions 88 and 90 of the steel support cradles 58 and 60, respectively. Magnets 92 and 94 permanently secured to the steel support cradles 58 and 60 are used to stabilize the parts being welded during the welding process. A stabilizing bar 97 is also welded to the fixture. After the assembly 67 is placed on the dradle support members 58 and 60 position to hold the assembly together.

Figure 5:
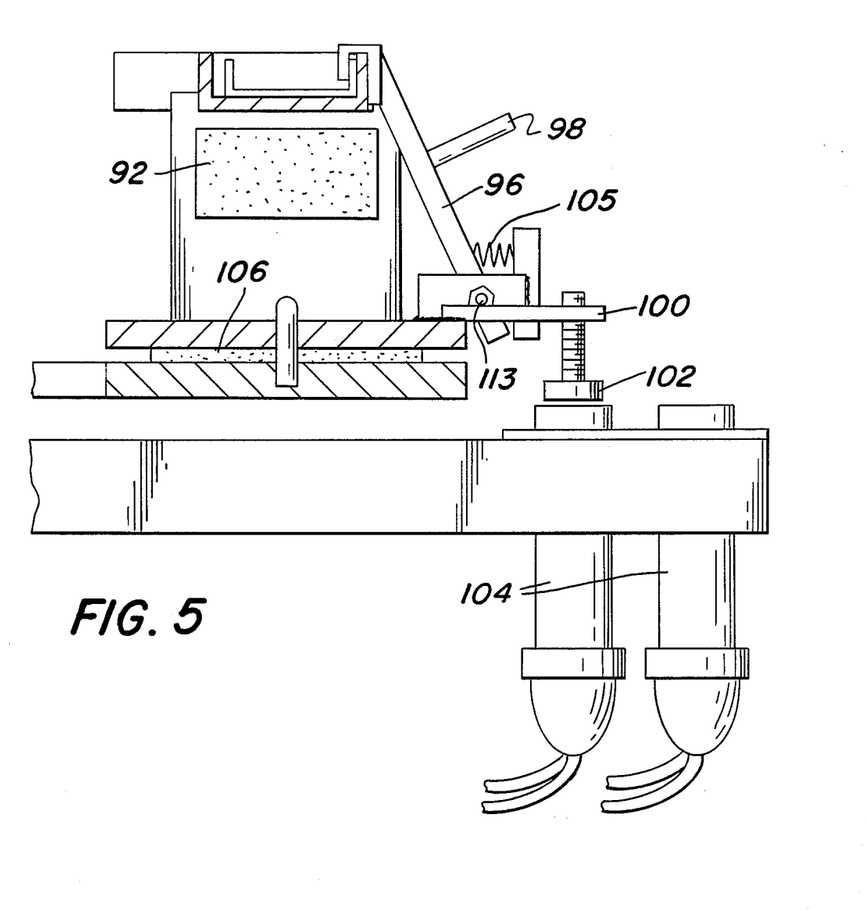
FIG. 5 is a view, partly in cross-section, of a fixture and a particular assembly of parts nested or held in position.
Figure 6:
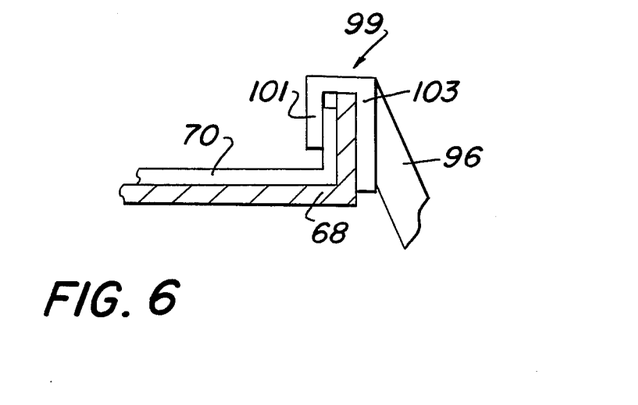
FIG. 6 is a cross-sectional enlarged view illustrating a portion of the clamping or nesting mechanisms, illustrated in FIG. 5.

The stampings or parts 68 and 70 are inserted between a member 99 secured to the end of the clamp arm 96, as illustrated in FIGS. 5 and 6. The member 99 includes two spaced portions 101 and 103 to receive the stampings 68 and 70 therebetween. The stampings or parts 68 and 70 are dimensioned so that they are by the member 99 is a nesting relationship without excessive pressure being applied, as was the case in many prior art systems. The resting of the parts in cut-outs on the cradles along with holding magnets make the assemblies easily and quickly installable on the fixtures.

The arm 96 is pivotally mounted plate 78 of the fixture by any suitable means, such connecting elements 107, 109 and 111 welded to the plate 78, with a spring 105 disposed between the arm 96 and the element 107. A pin 113 extends through the arm 96 to permit pivotable movement.

A bracket 100 is welded to the fixture plate 78. A pick-up probe selector element 102 which actuates a proximity switch, is positioned close to the probe bracket 100. A screw element 115 is attached to the probe 102 and threadedly engages the bracket 100.

The number of probe elements may vary. Any number of probes may be involved dependent upon the number of welding patterns to be controlled. The probe elements operate selected ones of a plurality of proximity switches to cause signals to be generated to identify the particular fixture involved. The fixture in effect identifies the assembly to be welded and controls signals which subsequently are used to control the welding means and weld pattern generated.

The plurality of parts selector switches, which may be proximity switches 104, is provided to generate signals which are connected to the programmer controller 36 (FIG. 1). The probe 102 generates a pre-determined signal to generate a weld pattern signal in accordance with the particular assembly mounted to the fixture.

When other assemblies other than that illustrated are used one or more probe brackets and probes would be secured to a fixture at different positions. Consequently the probes will actuate different selected proximity switches. When signals are developed dependent upon the location of the pick-up probes the program controller 36 will chose different welding patterns to be ultimately used and applied to the welding gun.

Because the fixtures for the different assemblies include the means for identifying a particular assembly, the speed at which a change-over to different assembly manufacturing is increased. Changes of fixtures moving different assemblies to be welded may therefore be made quickly and easily without disrupting the system operation for long periods of time.

The clamping mechanisms are relatively free of the use of large parts and the use of excessive pressures to hold the parts in an assembly. Magnets assist in holding the parts in place. Because the welding operation itself is precisely controlled, heavy parts or clamps are not required to maintain the parts in place during movements of the rotary table or welding of the parts.

The details illustrated in FIGS. 2 to 6 illustrate only one particular embodiment of the present invention. It is apparent that many of the parts illustrated may take different forms. In general, the present invention has provided the means for quickly changing a fixture so that different assemblies may be welded together by the same system. Means are provided for identifying particular assembly to be welded and for controlling the particular weld pattern to be used on the identified assembly. Double safety mean including a light curtain and mat are employed and to assure that an operator is away from the assembly area during rotation of the rotary table.

The present invention eliminates the costly design and heavy construction normally used to build a fixture. Lightweight fixtures may be changed over in less than 10 minutes with the present invention. Under the concept of quick change-over of fixtures the system of the present invention is relatively simple in design, is easily constructed and is lightweight and portable. Typical fixtures used heretofore have taken approximately 75 hours to construct. The present invention greatly reduces this time.

The "Rapid Robotic Assembly Change-over" workcell of the present invention has been designed and successfully used with the latest State-of-the-Art devices. A Cincinnati Milacron T3-776 electric D.C. Servo drive robot with Acramatic control and a 50 KVA trans-gun for resistance spot welding used in one embodiment of the invention. A four position rotary index tooling table with magnetically attached tooling fixtures was also used. A computer made by "Computer Technology Corporation" was used which includes an intelligent panel assembly with a CRT display module. keypad entry module and a 32 button illuminated push button module that functions as an interactive control console between the operator and the work-cell area. A Medar programmable weld controller was provided that can have as many as 15 separate weld schedules stored in memory that can be called up whenever the robot program calls for a weld. An Allen-Bradley PLC-2/05 Mini Programmable Controller coordinated the actions of the entire system to a degree determined by the mode selected by the system operator or maintenance personnel. It is apparent, however, that other types of equipment may be used without departing from the scope of the present invention.

The intent behind the system described was to design a system that would be modular, i.e., made up of separate pieces of equipment that could very quickly be dis-assembled, moved, re-assembled, and resume production in a minimum amount of time.

It was important too that the system of the present invention be easy to learn, even though the equipment itself is complex. Plant personnel, both production and maintenance, have been able to quickly understand how to operate the system.

An important feature emphasized throughout the application is the quick change-over from one job to another, where an operator is able to change over from one job to another in ten minutes or less and resume production of a different part.

Finally, it was important that the system take up a minimal amount of plant floor space. The system may run a minimum of three jobs for each rotary index table thereby realizing a savings in plant floor space.

In general once the system described was up and ready to run, an operator could proceed with the following steps:

1. Load pieces into the fixture that is currently in the load/unload station.
2. Step back from the load/unload station and push the table run buttons.
3. The table will index 180 degrees in two (2) 90 degree increments and stop.
4. The programmable controller will signal the robot to execute the proper program to weld the piece in the 180 degree work station.
5. While the robot is welding the pieces in the 180 degree work station, the operator loads pieces in the new fixture that is now in the load/unload station. When he is finished, he steps back from the load/unload station and pushes the table run buttons.
6. When the robot cycle is finished, the table will rotate 180 degrees and signal the robot again to execute the proper program for the piece in the 180 degree work station.
7. While the robot is welding in the 180 degree work station, the operator unloads the finished part from the first fixture and reloads the fixture with new parts.
8. The operator steps back from the load/unload station and pushes the table run buttons.
9. When the robot is finished welding, the table will rotate 180 degrees, initiate the proper robot weld program and the cycle will continue over and over.

Regarding the light curtain operation, the following steps are generally followed by the operator to control the steps involved:

1. Load pieces into the fixture that is currently in the load/unload station.
2. Steps out of the load/unload station, completely out of the light curtain area and off of the safety mat, and pushes the table run buttons. The light curtain table initiation circuitry is now active as indicated by the pilot light on the system control console.
3. The table will index 180 degrees in two 90 degree increments and stop.
4. The program controller will signal the robot to execute the proper program to weld the piece in the 180 degree work station.
5. While the robot is welding the pieces in the 180 degree work station, the operator loads pieces in the new fixture that is now in the load/unload station. When he is finished, he steps out of the load/unload station.
6. The light-curtain table initiation logic circuitry will set-up the table to index. When the robot cycle is finished, the table will rotate 180 degrees and signal the robot again to execute the proper program for the piece in the 180 degree work station.
7. While the robot is welding the pieces in the 180 degree work station, the operator unloads the finished part and loads new pieces in the fixture that is now in the load/unload station. When he is finished, he steps out of the load/unload station.

What is claimed is:

1. A programmed welded control system for welding different welding patterns on different assemblies of parts comprising:
   a. a rotary table indexed to be moved between home and welding stations;
   b. said rotary table being adapted to receive different fixtures for receiving different assemblies of parts;
   (c) a light assembly at said home station to detect the presence of an assembly on said rotary table;
   (d) electrical devices including a mat to detect the presence of an operator in the loading area of said assembly at said home station;
   (e) means on said fixtures to identify at said home station a particular assembly of parts and the welding pattern to be subsequently used on said particular assembly at said welding station.
   (f) means for rotating said table from said home station to said welding station,
   (g) welding means at said welding station to weld a weld pattern on the assembly of parts identified at said home station, and
   (h) a second light assembly for generating signals when an assembly is on said rotary table at said home station and said operator is away from said loading area to cause said rotary table to be rotated from said home station to said welding station.

2. A welding control system as set forth in claim 1 wherein said welding means includes a welding gun having a welding tip element and means are provided to automatically move said welding gun at periodic intervals to a tip dresser to dress the tip element of said welding gun.

3. A welding control system as set forth in claim 1 wherein said means for detecting the presence of an operator includes a mat at said home station for controlling a switch and a light curtain for generating light beams to produce control signals.

4. In a manufacturing operation, a system for receiving and welding different assemblies of parts, comprising:
   a. a rotary table indexed to be moved between home and welding stations;
   b. said rotary table being adapted to receive different fixtures for different assemblies at said home station;
   c. means for identifying the particular assembly of parts on a particular fixture at said home station to control a particular weld pattern to be subsequently used at said welding stations;
   d. means for precisely locating said fixtures on said rotary table to permit relatively fast change from one fixture to another;
   e. holding means secured to said fixtures to hold parts of said assemblies in a nesting relationship;
   f. means at said home station to detect the presence of an assembly of parts in a fixture on said rotary table;
   g. means at said home station to detect the presence of an operator in the loading area at said home station;
   h. means for rotating said table from said home station to said welding station when an assembly of parts is present in said fixture and the operator is away from said loading area;
   i. means for welding an assembly of parts at said welding station in accordance with a weld pattern identified at said home station, and
   j. means for rotating said table from said welding station to said home station after a welding operation.

5. The invention as set forth in claim 4 wherein said means for precisely locating comprise apertures in said fixtures disposed to receive locating pin elements secured to said rotary table.

6. The invention as set forth in claim 5 wherein said holding means further comprise magnetic elements on said fixtures to hold in place the parts of said assemblies.

7. The invention as set forth in claim 6 wherein said holding means further comprise spaced mechanical elements to receive parts of said assembly therebetween in a nesting relationship.

8. The invention as set forth in claim 7 wherein said holding means further comprises permanent magnets secured to said rotary table to receive said fixtures thereon.

9. The invention as set forth in claim 8 wherein said means for identifying includes proper brackets secured to said fixtures to control selective proximity switches to generate signals to control the weld pattern on the assembly of parts to be welded.

* * * * *

UNITED STATES PATENT AND TRADEMARK OFFICE
CERTIFICATE OF CORRECTION

PATENT NO. : 4,767,910

DATED : August 30, 1988

INVENTOR(S) : Raymond R. Stevens et al.

It is certified that error appears in the above-identified patent and that said Letters Patent is hereby corrected as shown below:

Claim 1, line 1  change word "welded" to --welding--.

Signed and Sealed this

Twenty-eighth Day of February, 1989

Attest:

DONALD J. QUIGG

Attesting Officer

Commissioner of Patents and Trademarks